March 8, 1949. R. C. DEHMEL 2,463,603
TRAINING APPARATUS FOR SIMULATING GYROCOMPASSES
Filed Nov. 7, 1946 2 Sheets-Sheet 1
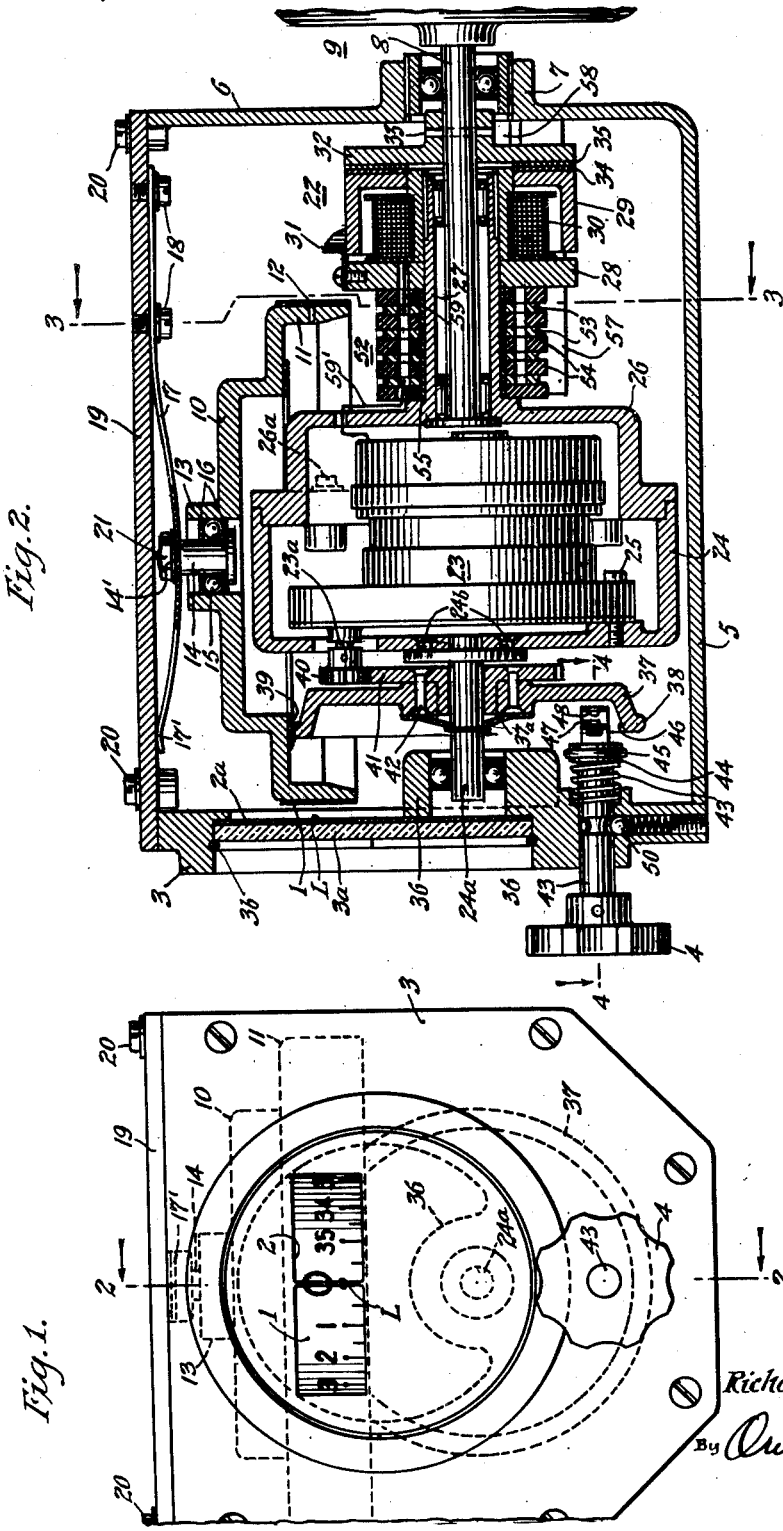
Inventor
Richard C. Dehmel
Attorney

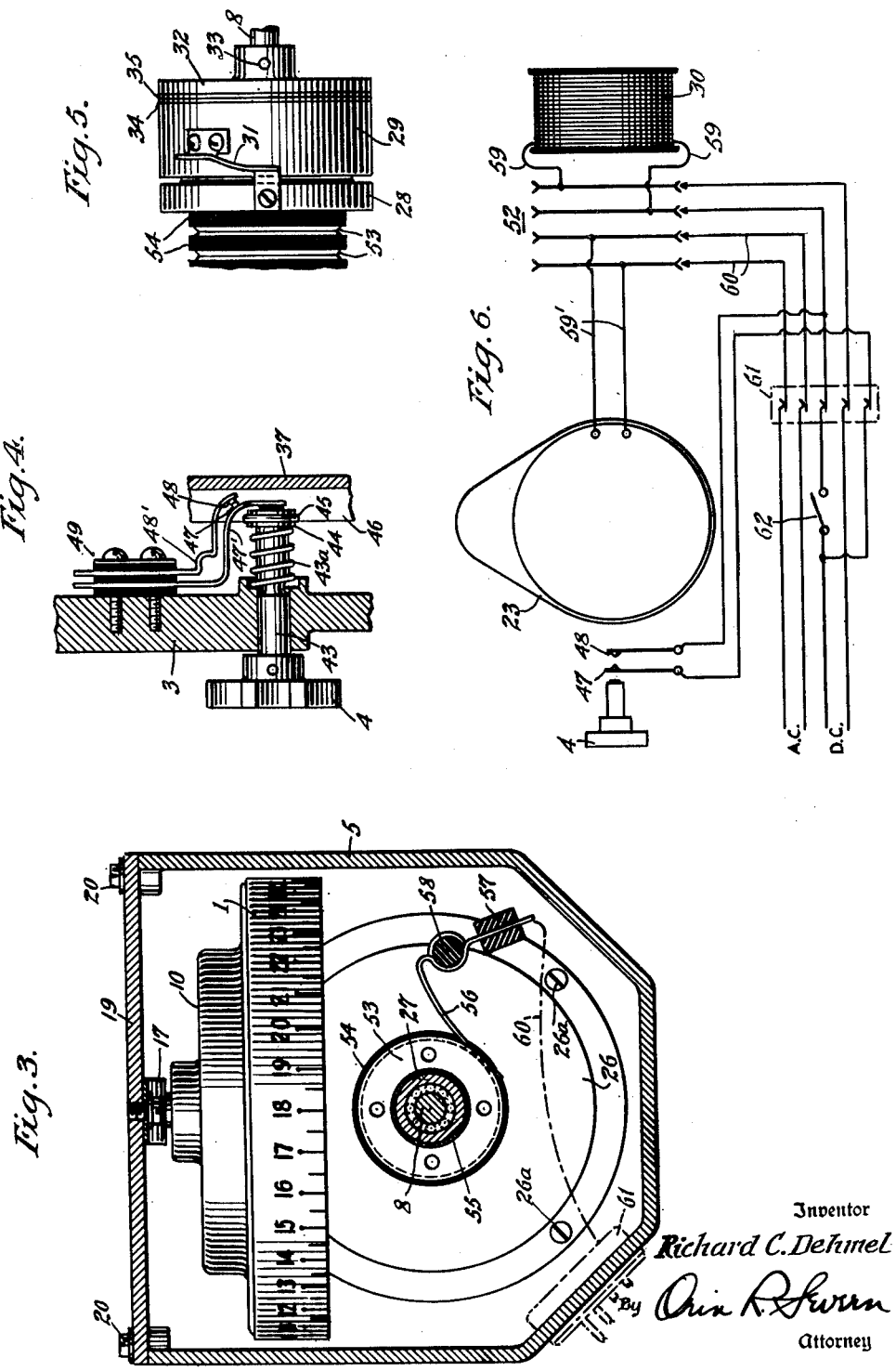

Patented Mar. 8, 1949

2,463,603

UNITED STATES PATENT OFFICE 2,463,603

TRAINING APPARATUS FOR SIMULATING GYROCOMPASSES

Richard Carl Dehmel, Summit, N. J.

Application November 7, 1946, Serial No. 708,384

8 Claims. (Cl. 177—337)

This invention relates to navigation training apparatus and particularly to gyro-compass training apparatus for grounded aircraft trainers of the type used for training pilots in orientation problems and practice maneuvers. Such trainers are provided with simulated aircraft controls and an instrument panel arranged so that various flight indicating devices on the instrument panel are actuated according to operation of the controls so as to simulate in a realistic manner actual navigation.

The directional gyro, or gyro-compass used in actual aircraft is a gyroscopically controlled instrument having a compass card that when set to agree with a magnetic compass at the beginning of a flight tends to maintain this orientation even during complicated maneuvers of the aircraft. The compass card can also be set at "zero" for example, regardless of the magnetic compass reading when the pilot is about to start "procedure" turns, thereby enabling the pilot to read the turn angle directly. The gyro element is however influenced by the earth's rotation so that a slight precession occurs and it is therefore necessary for the pilot to reset the instrument from time to time so that it is maintained in substantial agreement with the magnetic compass.

A principal object of the present invention is to provide improved apparatus for simulating a gyro-compass that is simple, compact and rugged in construction, efficient and realistic in its operation and that is particularly useful in the ground training of aircraft pilots.

A further object is to provide improved and efficient apparatus for causing precession of the simulated gyro element and for setting and resetting the instrument.

The invention will be more fully set forth in the following description referring to the accompanying drawings, and the features of novelty will be pointed out with particularity in the claims annexed to and forming a part of this specification.

Referring to the drawings, Fig. 1 is a front view of the panel and dial of the simulated gyro-compass embodying the present invention;

Fig. 2 is a sectional lateral view taken along the line 2—2 of Fig. 1;

Fig. 3 is a sectional view taken along the line 3—3 of Fig. 2;

Fig. 4 is a detail view of a portion of the resetting and declutching arrangement;

Fig. 5 is a fragmentary view of clutch construction, and

Fig. 6 is a simplified diagram illustrating the electric circuit connections for the apparatus.

The simulated directional gyro apparatus of the present invention is to outward appearance substantially the same as the apparatus used in actual aircraft as will be seen by reference to Fig. 1 which illustrates the front panel and dial of the apparatus. The circular compass card 1 is visible in part through a rectangular opening 2 in the front wall or panel 3 of the instrument housing. A resetting knob 4 for precession correction or card reorientation is located beneath the compass card and the front panel is generally shaped and designed to resemble standard equipment.

Referring more particularly to Fig. 2 the apparatus comprises a housing 5 having a front wall formed by the panel 3 above referred to and a rear wall 6 that is provided with a bearing portion 7 for the main operating shaft 8 that extends into the housing. The shaft 8 is suitably operated in accordance with change in simulated heading or direction of the trainer by any suitable means, such as a servo-motor generally indicated at 9, for controlling the compass card 1. The control of the servo-motor for simulating or representing direction heading may be, for example, as described in my Patent No. 2,366,603, granted January 2, 1945, for "Aircraft training apparatus"; or, in the case of a trainer having a rotatable fuselage, the servo may be in the form of a "repeater" responsive to a transmitter positioned according to the actual heading of the fuselage.

The compass card is mounted on a disc-like member 10 that is rotatable in a horizontal plane so that a portion of the card is always visible through the aforesaid rectangular opening 2. This opening is formed in a metal plate 2a mounted behind the glass face 3a of the panel and is divided by a fixed center index or "lubber line" L that consists of a narrow strip of material of the plate 2a. The glass front is held in place by a snap ring 3b. The compass member 10 has at its periphery a depending circular flange 11 to which the compass card is suitably secured, as by pins 12. A central hub-like portion 13 of the member 10 is provided with a stub shaft 14 that is mounted within the hub on a ball bearing 15 positioned between retaining rings 16. This compass assembly is resiliently suspended from the upper wall of the housing by means of a leaf spring 17 that is secured at one end by screws 18 to the lower side of a cover plate 19 detachably secured by screws 20 to the housing. The other end of the spring at 17' is unsecured so that it simply engages the lower side of the cover under initial spring tension. The spring 17 is provided with an aperture through which a reduced portion 14' of the stub shaft 14 extends for securing by means of retaining nut 21 the compass card assembly to the spring 17 so that in respect to axial movement the compass card is in floating relation to the housing.

The driving connection between the main operating shaft 8 and the compass card assembly includes suitable interrupting or disconnecting means, such as a magnetic clutch 22 and a motor 23 for simulating the precession error. The motor 23 has a comparatively high reduction ratio so that its output shaft 23a makes but one revolution in about four hours. The motor 23 is secured by bolts 25 to an end wall of a generally cylindrical enclosing housing 24 that is rotatably supported by means of a stud shaft 24a secured to said end wall as by screws 24b. The stud shaft is journalled in a hub-like extension 36 formed on the fixed inner wall of the front panel 3. The housing at its opposite end has bolted thereto at 26a an end cap 26 having a sleeve-like extension 27 that is rotatably supported on the shaft 8.

The housing 24 and the operating shaft 8 are normally interconnected for rotation as a unit by the motor 9 through the magnetic clutch 22, the magnetic circuit of which includes an iron ring or pole piece 28 secured to the extension 27 and a cup-like armature 29 enclosing the clutch operating coil 30 and arranged for limited reciprocal movement with respect to the pole piece 28. The armature 29 is normally biased away from the pole piece for engaging the clutch by means of leaf springs 31, Fig. 5, the ends of which are suitably secured to the pole piece and armature respectively.

The movable armature above described comprises one element of the clutch and a disc 32 rigidly secured by a pin 33 to the shaft 8 forms the other clutch element, the clutch surfaces themselves being formed by discs 34 and 35 composed of fibre or the like secured respectively to the opposing faces of the armature 29 and disc 32. When the clutch coil 30 is de-energized the spring 31 forces the clutch members into close engagement so that a driving connection is established between the shaft 8 and the rotatable housing 24. The stub shaft 24a also has rotatably mounted thereon a compass driving disc 37 having a peripheral flange and bead 38 for engaging an annular strip 39 secured to the under side of the compass member 10. The strip 39 may be composed of suitable material such as cork or rubber for facilitating friction drive of the compass card assembly by the disc 37 which is in turn rotatable by both the main shaft 8 and the motor 23 in a manner presently described. A spring washer 37a mounted on the shaft 24a provides a friction drive between the shaft and the disc 37 for obtaining in normal operation a direct drive between the housing 24 and disc 37.

The output shaft 23a of the precession motor is provided with a drive pinion 40 for engaging a gear 41 that is secured by rivets 42 to the driving disc 37. Accordingly it will be seen that operation of the precession motor drives the disc 37, and hence the compass card, directly through the gearing 40 and 41 since the precession motor torque is sufficient easily to overcome the friction of the spring washer 37a. Because of the high reduction ratio of the motor, the pinion 40 also serves as a direct connection between the motor housing 24 and the compass card driving disc 37 when the housing is rotated by shaft 8 in accordance with change in direction heading but this driving connection is subject to a certain amount of "back-lash" because of the gearing so that the direct friction washer drive at 37a is preferred. This friction connection therefore not only provides a direct connection without "back-lash" between the main drive and the disc 37 but does not interfere with the proper operation of the precession motor.

It will therefore be seen that the compass card is subject to two distinct influences, namely the trainer direction heading as represented by the shaft 8, and the simulated precession error as represented by the motor 23. The precession motor, which is conveniently of the type used in electric clocks, operates continuously so that the precession error is introduced though the shaft 8 be moving or stationary. In other words, when the main driving connection is complete through the clutch 22 the shaft 8 is effective to rotate as a unit the housing 24, inner-locked gears 40 and 41, stub shaft 24a and the driving disc 37 so as to cause corresponding rotation of the compass card member 10 to indicate the instant heading of the trainer. Concurrently therewith the precession motor 23 rotates the driving disc 37 through the gearing 40—41 with respect to the housing 24 so as to superimpose on the direction heading movement above described a movement simulating precession error. Thus the usual operation of a gyro compass under flight conditions is simulated.

For the purpose of resetting the compass card from time to time so as to correct precession error above referred to, the resetting knob 4 in the front panel is provided with means for establishing a friction drive with the disc 37 and also for causing energization of the magnetic clutch 22 for disconnecting the motor housing assembly from the main operating shaft 8.

Referring to the detail view, Fig. 4, the resetting knob 4 is connected to a plunger rod 43 that extends through the panel 3 toward the periphery of the disc 37. The plunger 43 is normally held by a spring detent 50 away from the disc 37 and is provided at its inner end with a collar 44 to which is secured a bead 45 of suitable material such as rubber for establishing a driving connection with the disc 37. This connection is made when the plunger is advanced and the bead 45 engages under proper pressure a lip 46 formed on the inner surface of the peripheral flange of the disc 37. A light spring 43a, Figs. 2 and 4, bearing between the panel 3 and plunger collar 44 serves during the resetting operation to maintain the plunger in driving engagement with the lip 46. Thus by pressing forward and then rotating the knob 4, the student can set or reset the compass card directly through the driving disc 37, assuming the clutch 22 is disconnected.

The declutching operation is automatically performed through a pair of switch contacts 47 and 48, Figs. 2 and 4, that are carried by spring conductors 47' and 48' and are moved into engagement by the plunger 43 as the knob 4 is pressed forward. The contacts 47 and 48 which are connected to a terminal block 49 on the panel 3, Fig. 4, control energization of the clutch solenoid coil 30 through suitable conductors and slip-ring connections presently described. After the compass card has been reset the pilot pulls back the knob 4 to its original position where the plunger is held by the resilient catch 50 and the contacts 47 and 48 separate under normal spring bias to open the coil circuit. Thus the clutch coil is de-energized so that the clutch member 29 is biased by spring 31 toward member 32 and the driving connection between the main shaft 8 and the compass card is reestablished.

The electrical connections for the electric motor 23 and magnetic clutch 22 include a slip-ring assembly 52, Figs. 2 and 3, composed of conducting slip-rings 53 and insulating discs 54 alternately stacked on the housing extension 27, the slip-rings being insulated from the extension by a sleeve 55. The respective brushes for engaging the slip-rings are mounted along the axis of the slip-ring assembly, Fig. 3, and comprise conductors 56 mounted along the terminal and supporting posts 57 and 58 respectively. The specific construction and mode of operation of the brush and slip-ring assembly is claimed and more fully described in a copending application of Erling M. Knudsen, S. N. 693,590, filed August 28, 1946, now Patent No. 2,451,959, dated October 19, 1948, for "Electric slip-ring and brush connection." The slip-rings 53 are suitably connected by conductors indicated at 59 and 59' to the clutch coil 30 and the motor 23 respectively in the manner indicated in Fig. 6 and the coacting fixed brushes 56 are suitably connected by conductors such as indicated at 60 to external circuits indicated by the plug connection 61, Fig. 3. The external circuits, Fig. 6, include a D. C. source for the clutch coil and an A. C. source for the electric motor, and if desired, an instructor's switch 62 connected in shunt with the resetting switch 47—48 for controlling energization of the clutch.

It should be understood that this invention is not limited to specific details of construction and arrangement thereof herein illustrated, and that changes and modifications may occur to one skilled in the art without departing from the spirit of the invention.

What is claimed is:

1. Training apparatus for simulating a gyro-compass comprising a rotatable compass card, a driving connection between said compass card and an actuating means representing direction heading of a trainer, including a motor in addition to said actuating means for superimposing a slow rotation simulating precession on the direction movement of said compass card produced by said actuating means, and means for rendering inoperative said driving connection and resetting said compass card.

2. Training apparatus for simulating a gyro-compass comprising a rotatable compass card, a driving connection between said card and an actuating means representing direction heading of a trainer, said connection including a motor in addition to said actuating means for superimposing a slow rotation simulating precession on the direction movement of said compass card produced by said actuating means, and resetting means for controlling said driving connection so as to rotate said compass card independently of said actuating means and correct simulated precession error.

3. Training apparatus for simulating a gyro-compass comprising a rotatable compass card, a driving connection between said compass card and an actuating means representing direction heading of a trainer including both a clutch and a motor in addition to said actuating means, said motor arranged to superimpose a slow rotation simulating precession on the direction movement of said compass card produced by said actuating means, said motor being rotatable as a unit with said driving connection, and means for operating said clutch and resetting said compass card independently of said actuating means.

4. Training apparatus for simulating a gyro-compass comprising a rotatable compass card, a driving connection between said card and an actuating means representing direction heading of a trainer, said connection having incorporated therein a motor and gearing for superimposing a slow rotation simulating precession on said compass card in addition to the direction movement produced by said actuating means, a clutch for disconnecting said actuating means from that part of the driving connection including said motor, and resetting means for controlling said clutch and for rotating said compass card together with the aforesaid part of the driving connection including said motor so as to correct simulated precession error.

5. Training apparatus for simulating a gyro-compass comprising a rotatable disc-like element carrying a compass card, a driving connection between said element and an actuating means representing direction heading of a trainer, said connection including both a solenoid controlled clutch and a motor in addition to said actuating means connected through a friction transmission to said element all rotatable by said actuating means, said motor arranged to superimpose a slow rotation simulating precession on the direction movement of said compass element produced by said actuating means, said clutch being arranged to disconnect said actuating means from said compass element, and resetting means for controlling energization and de-energization of the clutch solenoid and for rotating said compass card through said friction transmission when the clutch is disengaged so as to correct simulated precession error.

6. Training apparatus for simulating a gyro-compass comprising a rotatable compass card, a driving connection between said compass card and an actuating means representing direction heading of a trainer, said connection including a motor in addition to said actuating means and gearing for superimposing a slow rotation simulating precession on the direction movement of said compass card produced by said actuating means, and a yieldable device adapted to form a direct connection between said compass card and said actuating means independently of said motor for preventing back-lash through the motor and gearing, said yieldable connection being adapted to yield for operating said compass card under influence of the precession motor torque.

7. Training apparatus for simulating a gyro-compass comprising a rotatable compass card, a driving connection between said compass card and an actuating means representing direction heading of a trainer, said connection including a motor in addition to said actuating means and gearing for superimposing a slow rotation simulating precession on the direction movement of said compass card produced by said actuating means, and a spring pressure friction device for preventing back-lash through the motor gearing adapted to form a direct connection between said compass card and said actuating means, said friction connection being adapted to yield for operating said compass card under influence of the precession motor torque.

8. Training apparatus for simulating a gyro-compass comprising a rotatable compass card, actuating means representing the direction heading of a trainer for rotating and orienting said card, a direct mechanical connection between said actuating means and compass card including a motor supporting structure and a friction connection arranged in series relation so that normally said actuating means drives said compass card directly thereby, a precession motor mounted on said supporting structure connected through reduction gearing to said compass card and arranged to overcome said friction connection for superimposing a slow rotation simulating precession on the direction movement of said compass card produced by said actuating means, said friction connection thereby eliminating backlash at said reduction gearing during operation of the compass card by said actuating means, and resetting means for said compass card operable independently of said actuating means.

RICHARD CARL DEHMEL.

REFERENCES CITED

The following references are of record in the file of this patent:

UNITED STATES PATENTS

| Number | Name | Date |
|---|---|---|
| 2,366,603 | Dehmel | Jan. 2, 1945 |
| 2,379,869 | Baker | July 10, 1945 |
| 2,398,677 | Stockfield | Apr. 16, 1946 |